2,891,095

PROCESS FOR PREPARING KETONES

Wolfgang Opitz, Knapsack, near Koln, and Werner Urbanski, Koln-Bickendorf, Germany, assignors to Knapsack-Griesheim Aktiengesellschaft, Knapsack, near Koln, Germany, a corporation of Germany No Drawing. Application February 24, 1955
Serial No. 490,401

Claims priority, application Germany February 25, 1954

5 Claims. (Cl. 260—593)

The present invention relates to a process for preparing ketones.

It is known to prepare methyl-isobutyl ketone on an industrial scale from isopropanol with acetone, diacetone alcohol and mesityl oxide as intermediaries.

Methyl-isobutyl ketone can also be obtained from acetone at 180°–300° C. with the addition of hydrogen in the presence of a catalyst consisting of magnesium oxide and small amounts, preferably 2–4 percent, of metallic copper. This catalyst may be obtained from copper oxide and magnesite.

It is furthermore known to obtain ketones, such as acetone, methyl-isobutyl ketone, di-isobutyl ketone or mesityl oxide, from secondary alcohols under pressure and at raised temperatures up to 500° C. at various mixed catalysts, for example those containing chromium, zinc, copper, magnesium and cadmium.

Methyl-isobutyl ketone and di-isobutyl ketone are excellent solvents, for example, for plastics and polymers.

Now we have found that methyl-isobutyl ketone, di-isobutyl ketone and/or acetone can be obtained directly from isopropanol in the presence of a particularly suitable mixed catalyst which simultaneously effects dehydrogenation, condensation, dehydration and hydrogenation under atmospheric pressure and at temperature lower than those applied in the known processes. The quantities of acetone obtained by the process of the present invention depend on the particular reaction conditions used. The yield of acetone, for example, ranges from about 9 to 68 percent, calculated on the reacted isopropyl alcohol.

The mixed catalyst according to the invention is obtained from a mixture of (1) a copper compound, for example cuprous oxide or preferably copper hydroxide or cupric oxide, (2) magnesium oxide and (3) a dehydration catalyst of which at least two thirds is pumice and which may furthermore contain the additions described hereinafter. The above mixture is briqueted advantageously with a suitably combustible binder, for example an aqueous solution of methyl cellulose of 0.5 percent strength. The briquets are dried, for example at about 100° C., and baked at a temperature above about 600° C. Baking may also be effected at a higher temperature, for example at about 700° C.; care must only be taken that such temperatures are selected as do not promote sintering. By the use of a binder the briquet is rendered more wear-resistant than when no binder is used, and in many cases, i.e. when the binder is consumed by the baking process, a greater porosity is simultaneously imparted to the finished catalyst. It is of advantage subsequently to treat the catalyst so obtained with steam, for example at about 400° C.–about 500° C., thus imparting to it an improved and long-lasting activity.

The resultant catalyst can be used directly. The reduction of the copper oxide which, in this case, is effected in the beginning of the reaction may advantageously be carried out previously, for example by treating the catalyst with hydrogen at low temperatures, for example between about 200° C. and about 300° C. By this treatment the copper oxide is reduced to a large extent to the metal.

For the preparation of the catalyst according to the invention it is of advantage to use a highly voluminous magnesium oxide, i.e. one having a large surface, as it is obtained, for example, by thermal decomposition of magnesium hydroxide or basic magnesium carbonate. It is not necessary to add the magnesium oxide as such; it may also be added in the form of compounds which, under the conditions of preparation, yield magnesium oxide, especially a magnesium oxide of a large surface, for example basic magnesium carbonate or magnesium hydroxide. The mixtures of the copper and magnesium compounds can be obtained not only by mixing but advantageously also by precipitating the compounds together from their salts.

The copper compounds, i.e. the cuprous oxide, the copper hydroxide and the cupric oxide can be obtained by known methods from copper salts. In this manner a particularly fine-grained cupric oxide is, for example, obtained.

For carrying out the process of the invention, the above described method of preparing the catalyst may, however, be modified without essentially changing the effect of the catalyst. Such modifications are steps familiar to those skilled in the art and need not be described in detail.

The proportion by weight of the copper compound, calculated as CuO, to magnesium oxide ranges from about 5:1 to about 0.5:1, preferably from about 2:1 to about 1:1. The proportion by weight of copper (calculated as oxide CuO) to the total of the dehydration catalyst and the magnesium oxide ranges from about 4:1 to about 1:4, preferably from about 2:1 to about 1:2. With a high proportion of CuO:MgO a relatively large quantity of acetone is obtained. When, however, a large portion of magnesium oxide is used, the reaction is liable to end with the formation of mesityl oxide, that is to say the hydrogenation which would otherwise follow does not take place.

When the catalyst according to the invention is used, the copper effects the dehydrogenation and hydrogenation. In addition to its property to add and to split off hydrogen, the magnesium oxide, as an alkaline component, effects the condensation and, furthermore, shows a dehydrating property. The above dehydration catalyst may contain one or several additions having a neutral or feebly alkaline reaction, such as alumina, titanium oxide, aluminum phosphate, zinc oxide, thorium oxide and sodium chromate. It is obvious to those skilled in the art that the quantity to be added depends on the nature of the substance used. Advantageously, however, a quantity not exceeding 50 percent of the amount of pumice is employed, that is to say suitably at least two thirds of the dehydration catalyst is pumice.

As starting material for the conversion of isopropanol into methyl-isobutyl ketone and di-isobutyl-ketone an isopropanol is used having as high a concentration as possible, for example, above 80 percent, since the higher the content of water, the lower is the dehydrating effect of the catalyst and consequently the formation of methyl-isobutyl ketone and di-isobutyl ketone. The higher the concentration of the isopropanol used, the longer is the life time of the catalyst and the better proceeds the reaction. There may be used, for example, the azeotropic mixture of about 88 percent of isopropanol and about 12 percent of water which is often obtained in industry.

For the formation of the methyl-isobutyl ketone and di-isobutyl ketone a long catalyst contact time is of advantage. For the formation of acetone a short contact time is suitably applied. The charge of contact by which the contact time is determined generally ranges from about 1:2 to about 1:15. For the preparation of methyl-isobutyl ketone and di-isobutyl ketone a charge of contact ranging from about 1:8 to about 1:10 has proved most suitable, that is to say 8 to 10 parts by volume of catalyst are used per part by volume of liquid isopropanol added per hour.

Longer contact times are little economical. The reaction temperature ranges from about 250° C.–about 350° C., preferably from about 250° C.–about 300° C. At temperatures above 300° C., side reactions, for example the formation of olefins and decomposition, begin to increase so that it is not advantageous to effect the process of the invention at temperatures above about 350° C.

The reaction is carried out by passing vaporous isopropanol under reduced or superatmospheric pressure or advantageously under atmospheric pressure over the catalyst of the invention. About 94 to about 97 percent of the isopropanol is thereby reacted. In addition to methyl-isobutyl ketone and di-isobutyl ketone, there are also obtained acetone and very small quantities of constituents of a higher boiling point, for example alcohols and ketones of higher molecular weight. At the beginning of the reaction, the formation of methyl-isobutyl ketone and di-isobutyl ketone is particularly good. The longer the operation time of the catalyst, the less the yield of these 2 substances and the higher the yield of acetone. Furthermore, the longer the operation time of the catalyst, the lower the yield of di-isobutyl ketone and the higher the yield of methyl-isobutyl ketone. Similarly, but insignificant yields of other products of a higher boiling point are obtained upon increasing the operation time. The resulting mixture of methyl-isobutyl ketone, di-isobutyl ketone and acetone is worked up by known methods. For example, water may be added to the mixture and the ketones may then be separated by fractional distillation.

After the catalyst has been regenerated, the above process is repeated so that, depending on the moment at which the catalyst is regenerated, acetone, methyl-isobutyl ketone and di-isobutyl ketone can be obtained in the desired quantitative proportions.

The catalyst can be regenerated, for example, as follows: the catalyst is slowly oxidized with air, if desired with addition of nitrogen, for example, at a temperature of about 200° C.–about 250° C., then reoxidized, for example at about 400° C.–about 500° C., subsequently treated with steam, for example at about 400°C.–about 500° C., and then reduced with hydrogen, for example at about 200° C.–about 300° C.

As compared with the known process using acetone as starting material and employing catalysts which consist only of copper oxide and magnesium oxide, the process according to the invention offers the following special advantages:

Due to the special and specific composition of the catalyst, isopropanol can be used as a starting material. It is, therefore, not necessary first to prepare acetone from isopropanol if di-isobutyl ketone and methyl-isobutyl ketone are to be obtained in the first place. Nor is it necessary first to prepare and then to add hydrogen, so that the process is essentially simplified.

The catalyst has a long life time. It furnishes a high conversion and good yields of methyl-isobutyl ketone and di-isobutyl ketone. The resulting quantity of constituents of a higher boiling point is relatively small.

The following example serves to illustrate the invention but it is not intended to limit it thereto, the parts being by weight:

Example

These are used 2.1 liters=about 1870 grams of a catalyst having been obtained from a mixture of 48.4 parts of fine cupric oxide, 34.6 parts of fine magnesium oxide and 17 parts of pumice powder.

The mixture of said compounds has been wetted with about 10–12 parts of an aqueous solution of methyl cellulose of 0.5 percent strength, made into briquets having a diameter of about 3–6 millimeters, dried at 100° C. and then baked for about 2 hours at about 600° C. The catalyst mixture has then been reduced with hydrogen in a heatable reaction tube.

Over the catalyst so obtained are passed per hour about 170–210 grams of isopropyl alcohol of 99 percent strength in the form of vapor. At the beginning the reaction temperature amounts to about 250° C. and is slowly somewhat increased after several days of reaction. At this temperature a mixture is obtained in the course of about 16 hours which consists chiefly of di-isobutyl ketone in addition to methyl-isobutyl ketone and small amounts of acetone. The amount of isopropyl alcohol which undergoes conversion is about 98 percent. The yield of the three substances mentioned above is about 94.6 percent. When the introduction of the isopropyl alcohol vapor is continued for a prolonged time without regeneration of the catalyst, the formation of di-isobutyl ketone gradually diminishes and essentially larger quantities of methyl-isobutyl ketone and acetone are formed and after about 952 hours the portion of acetone rises to about 68 percent while the yield rises to 99.0 percent. The table given hereinafter indicates the corresponding values after a certain time of reaction.

When in the first place di-isobutyl ketone is to be obtained, the catalyst must be regenerated when the portion of this ketone diminishes essentially; this moment can be easily determined by those skilled in the art.

The catalyst is then oxidized at about 200° C.–about 250° C. with air, to which a small amount of nitrogen may be added, at a low speed of gas, then reoxidized at about 400° C.–about 500° C. and finally aftertreated with steam at about 400° C.–about 500° C. at a somewhat increased speed of gas. The catalyst is then reduced at about 200° C.–about 300° C. with hydrogen. The regenerated catalyst acts in the same manner as at the beginning of the reaction and leads to the same yields of methyl-isobutyl ketone and di-isobutyl ketone.

When in the first place methyl-isobutyl ketone and acetone are to be obtained, the catalyst need not be regenerated before its activity decreases remarkably. It is regenerated in the manner described above. For this reaction the catalyst remains effective for months; the yields amount to about 98–99 percent.

Practically the same results are obtained by using a catalyst which is obtained from 49.6 percent of copper oxide, 33.1 percent of magnesium oxide, 1.3 percent of aluminum phosphate, 1 percent of sodium chromate and 15 percent of pumice powder as described above.

| time of operation in hours | temperature in °C. | conversion in percent by weight | yield in mol percent (calculated on the isopropanol converted) of— | | | |
|---|---|---|---|---|---|---|
| | | | methyl-isobutyl ketone | di-isobutyl ketone | acetone | total |
| 16 | 250 | 98.0 | 19.6 | 65.8 | 9.0 | 94.4 |
| 72 | 250 | 94.0 | 30.1 | 14.9 | 50.5 | 95.5 |
| 136 | 260 | 95.0 | 35.0 | 11.5 | 51.1 | 97.6 |
| 312 | 260 | 94.0 | 29.1 | 7.4 | 62.2 | 98.7 |
| 952 | 270 | 93.8 | 26.5 | 4.4 | 68.1 | 99.0 |

After 984 hours of operation there are obtained on an average—

| | | | 93.9 | 29.2 | 10.4 | 58.5 | 98.1 |
|---|---|---|---|---|---|---|---|

We claim:
1. A process for producing relatively large amounts of methylisobutyl ketone and di-isobutyl ketone, which comprises contacting isopropanol vapor with a catalyst at a temperature of between about 250° C. and 350° C., said catalyst consisting essentially of a briquetted mixture of about 48–50 parts by weight pulverulent copper oxide, about 33–35 parts by weight pulverulent magnesium oxide and about 15–17 parts by weight pulverulent pumice.

2. The process of claim 1 wherein the isopropanol vapor is obtained from an aqueous solution having a concentration of isopropanol exceeding 80 percent.

3. A catalyst for use in the preparation of methyl-isobutyl ketone and di-isobutyl ketone directly from isopropanol, said catalyst comprising a briquette consisting essentially of a mixture of about 48–50 parts by weight pulverulent copper oxide, about 33–35 parts by weight pulverulent magnesium oxide and about 15–17 parts by weight pulverulent pumice.

4. The catalyst of claim 3 wherein the pulverulent magnesium oxide is obtained by the thermal decomposition of a magnesium compound selected from the group consisting of magnesium hydroxide and basic magnesium carbonate.

5. The catalyst of claim 3 wherein the briquette also contains a small amount of at least one additive selected from the group consisting of alumina, titanium oxide, aluminum phosphate, zinc oxide, thorium oxide and sodium chromate, pumice being present in an amount which is at least two-thirds of the total amount of pumice and additive.

References Cited in the file of this patent

UNITED STATES PATENTS

| | | |
|---|---|---|
| 1,813,953 | Reppe | July 14, 1931 |
| 1,889,672 | Larson | Nov. 29, 1932 |
| 2,039,543 | Lorang | May 5, 1936 |
| 2,279,198 | Huppke | Apr. 7, 1942 |
| 2,524,566 | Houtman et al. | Oct. 3, 1950 |

FOREIGN PATENTS

| | | |
|---|---|---|
| 483,233 | Canada | May 13, 1952 |